United States Patent
Zhang (10) Patent No.: US 10,462,735 B2
(45) Date of Patent: Oct. 29, 2019

(54) METHOD, TERMINAL AND COMPUTER STORAGE MEDIUM FOR REALIZING NETWORK ACCESS IN NON-LOCAL NETWORK

(71) Applicant: ZTE Corporation, Shenzhen (CN)

(72) Inventor: Hong Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 48 days.

(21) Appl. No.: 15/572,975

(22) PCT Filed: Oct. 23, 2015

(86) PCT No.: PCT/CN2015/092744
§ 371 (c)(1),
(2) Date: Nov. 9, 2017

(87) PCT Pub. No.: WO2016/179966
PCT Pub. Date: Nov. 17, 2016

(65) Prior Publication Data
US 2018/0146421 A1 May 24, 2018

(30) Foreign Application Priority Data
May 12, 2015 (CN) .......................... 2015 1 0239908

(51) Int. Cl.
*H04W 48/18* (2009.01)
*H04W 48/20* (2009.01)
(Continued)

(52) U.S. Cl.
CPC .......... *H04W 48/18* (2013.01); *H04W 8/065* (2013.01); *H04W 8/183* (2013.01); *H04W 8/205* (2013.01);
(Continued)

(58) Field of Classification Search
CPC ..... H04W 48/18; H04W 8/065; H04W 8/183; H04W 8/205; H04W 12/06; H04W 36/00; H04W 48/20
See application file for complete search history.

(56) References Cited

U.S. PATENT DOCUMENTS 7,653,200 B2 * 1/2010 Karmi ................ H04L 12/5692
380/270
7,885,654 B2 2/2011 Fadell
(Continued)

FOREIGN PATENT DOCUMENTS

CN 103428696 A 12/2013
CN 103987025 A 8/2014
(Continued)

OTHER PUBLICATIONS

International Search Report in international application No. PCT/CN2015/092744 dated Feb. 17, 2016, 2 pgs.
(Continued)

*Primary Examiner* — Chi H Pham
*Assistant Examiner* — Weibin Huang
(74) *Attorney, Agent, or Firm* — Cooper Legal Group, LLC (57) ABSTRACT

A method for implementing network access, a terminal and a computer storage medium are provided. The method includes that: when detecting that a terminal is located in a non-local network, a network identifier corresponding to the non-local network is acquired, wherein the non-local network is different from a network to which a Subscriber Identity Module (SIM) card of a terminal belongs; a data connection is established according to the network identifier, and authentication information of a virtual SIM card for accessing the non-local network is acquired; and the termi-
(Continued)

nal accesses the non-local network by using the authentication information of the virtual SIM card.

15 Claims, 7 Drawing Sheets

(51) Int. Cl.
*H04W 8/06* (2009.01)
*H04W 8/18* (2009.01)
*H04W 12/06* (2009.01)
*H04W 8/20* (2009.01)
*H04W 36/00* (2009.01)

(52) U.S. Cl.
CPC ........... *H04W 12/06* (2013.01); *H04W 36/00* (2013.01); *H04W 48/20* (2013.01)

(56) References Cited

U.S. PATENT DOCUMENTS

| | | |
|---|---|---|
| 8,843,132 B2 | 9/2014 | Fadell |
| 2008/0085707 A1* | 4/2008 | Fadell .................. H04W 8/065 455/435.3 |
| 2011/0130140 A1 | 6/2011 | Fadell |
| 2011/0194553 A1* | 8/2011 | Sahin ...................... H04W 4/90 370/352 |
| 2013/0023235 A1* | 1/2013 | Fan ...................... H04W 48/18 455/411 |
| 2013/0329639 A1 | 12/2013 | Wietfeldt et al. |
| 2014/0004827 A1* | 1/2014 | O'Leary .................. H04W 8/22 455/411 |
| 2015/0106268 A1* | 4/2015 | Carroll ............... G06Q 20/3224 705/44 |
| 2015/0172922 A1 | 6/2015 | An et al. |
| 2015/0215773 A1* | 7/2015 | Bai ........................ H04W 8/183 455/418 |
| 2016/0050556 A1* | 2/2016 | Zhao ....................... H04W 8/20 455/432.1 |
| 2016/0127132 A1* | 5/2016 | Lee ........................ H04L 9/0819 713/156 |

FOREIGN PATENT DOCUMENTS

| | | |
|---|---|---|
| CN | 104380807 A | 2/2015 |
| CN | 104540118 A | 4/2015 |
| EP | 2627109 A1 | 8/2013 |
| EP | 2680628 A1 | 1/2014 |
| WO | 2010144479 A2 | 12/2010 |
| WO | 2014193181 A1 | 12/2014 |

OTHER PUBLICATIONS

English Translation of the Written Opinion of the International Search Authority in international application No. PCT/CN2015/092744, dated Feb. 17, 2016, 6 pgs.

Supplementary European Search Report in European application No. 15891665.0, dated May 4, 2018, 4 pgs.

* cited by examiner

METHOD, TERMINAL AND COMPUTER STORAGE MEDIUM FOR REALIZING NETWORK ACCESS IN NON-LOCAL NETWORK

TECHNICAL FIELD

The disclosure relates to the field of communications, and in particular to a method for implementing network access, a terminal and a computer storage medium.

BACKGROUND

Both a Subscriber Identity Module (SIM) card and a Universal SIM (USIM) card belong to intelligent cards, which are certificates for a user to log in; that is, an SIM/USIM card is used for uniquely identifying a subscriber. For a terminal user, the SIM/USIM card has the following four functions: 1) a user data storage function, for example, storage of International Mobile Subscriber Identity (IMSI) and an authentication Key (K); 2) a user security management function, for example, operation and management of a Personal Identification Number (PIN), a PIN Unlocking Key (PUK) and so on; 3) a user identity authentication function, that is, an authentication algorithm and an authentication result are provided to identify a legal identity of the user, so that the user can access a network successfully; 4) an operator customized service function, for example, operator customized valued-added services like USIM card Application Tool Kit (USAT).

Because the SIM card is a certificate for the user to log in, when the terminal user roams from an area A to an area B, making a call, accessing the Internet and conducting data services in the area B will incur high roaming charges. At the same time, because the user is in a roaming state, and has a relatively low priority of an operator system in the area B, neither network speed nor call quality can be fully ensured.

For solving the above problem, the terminal user generally changes the SIM card to implement a normal conversation in a roaming area, so as to enjoy a lower price and enjoy the same service as a local card.

SUMMARY

The disclosure provides a method for implementing network access, a terminal and a computer storage medium; through the method, the terminal can access the network of a roaming destination by using acquired information of a virtual SIM card without changing the SIM card, thereby enjoying a lower price and enjoying the same service as a local card based on a normal conversation in a roaming area.

The technical solutions of the disclosure are implemented as follows.

The disclosure provides a method for implementing network access, which is applied to a terminal; the method includes that:

when detecting that the terminal is located in a non-local network, a network identifier corresponding to the non-local network is acquired, wherein the non-local network is different from a network to which an SIM card of the terminal belongs;

a data connection is established with a network server according to the network identifier, and authentication information of a virtual SIM card for accessing the non-local network is acquired; and the terminal accesses the non-local network by using the authentication information of the virtual SIM card.

In the above solution, establishing the data connection with the network server according to the network identifier, and acquiring the authentication information of the virtual SIM card for accessing the non-local network includes that:

a network access parameter corresponding to the network identifier of the non-local network is acquired based on a corresponding relationship between the network identifier and the network access parameter;

the data connection is established by using the network access parameter, and a routing address for accessing a database server is acquired from the network server; and the terminal accesses the database server by using the routing address, and acquires the authentication information of the virtual SIM card for accessing the non-local network.

In the above solution, establishing the data connection by using the network access parameter, and acquiring the routing address for accessing the database server from the network server includes that:

a first connection request is initiated to the network server, wherein the first connection request is used for requesting the routing access for accessing the database server, and carries the network access parameter corresponding to the network identifier of the non-local network;

a first connection request response fed back by the network server is received; and the first connection request response is parsed to acquire the routing address for accessing the database server.

In the above solution, accessing the database server by using the routing address, and acquiring the authentication information of the virtual SIM card for accessing the non-local network includes that:

the routing address is taken as a source routing address, and a second connection request is initiated to the database server, wherein the second connection request is used for requesting the authentication information of the virtual SIM card for accessing the non-local network;

a second connection request response fed back by the network server is received; and the second connection request response is parsed to acquire the authentication information of the virtual SIM card for accessing the non-local network.

In the above solution, the second connection request carries data format information;

correspondingly, parsing the second connection request response to acquire authentication information of the virtual SIM card for accessing the non-local network includes that:

the second connection request response is parsed to acquire the authentication information of the virtual SIM card for accessing the non-local network, which matches the data format information.

In the above solution, the method further includes that:

when detecting that the network identifier corresponding to the non-local network changes, the network identifier corresponding to the non-local network is reacquired.

The disclosure also provides a computer storage medium, in which computer executable instructions are stored; the computer executable instructions are arranged to perform the method for implementing network access of the disclosure.

The disclosure also provides a terminal, which includes a first acquiring module, a second acquiring module and an accessing module;

the first acquiring module is arranged to, when it is detected that the terminal is located in the non-local network, acquire the network identifier corresponding to the non-local network, wherein the non-local network is different from the network to which the SIM card of the terminal belongs;

the second acquiring module is arranged to establish the data connection according to the network identifier, and acquire the authentication information of the virtual SIM card for accessing the non-local network; and the accessing module is arranged to access the non-local network by using the authentication information of the virtual SIM card.

In the above solution, the second acquiring module includes a first acquiring unit, a second acquiring unit and a third acquiring unit;

the first acquiring unit is arranged to acquire the network access parameter corresponding to the network identifier of the non-local network based on the corresponding relationship between the network identifier and the network access parameter;

the second acquiring unit is arranged to establish the data connection by using the network access parameter, and acquire the routing address for accessing the database server from the network server; and the third acquiring unit is arranged to access the database server by using the routing address, and acquire the authentication information of the virtual SIM card for accessing the non-local network.

In the above solution, the second acquiring unit includes a first sending subunit, a first receiving subunit and a first parsing subunit;

the first sending subunit is arranged to initiate the first connection request to the network server, wherein the first connection request is used for requesting the routing access for accessing the database server, and carries the network access parameter corresponding to the network identifier of the non-local network;

the first receiving subunit is arranged to receive the first connection request response fed back by the network server; and the first parsing subunit is arranged to parse the first connection request response to acquire the routing address for accessing the database server.

In the above solution, the third acquiring unit includes a second sending subunit, a second receiving subunit and a second parsing subunit;

the second sending subunit is arranged to take the routing address as the source routing address, and initiate the second connection request to the database server, wherein the second connection request is used for requesting the authentication information of the virtual SIM card for accessing the non-local network;

the second receiving subunit is arranged to receive the second connection request response fed back by the network server; and the second parsing subunit is arranged to parse the second connection request response to acquire the authentication information of the virtual SIM card for accessing the non-local network.

In the above solution, the second connection request carries the data format information;

correspondingly, the second parsing subunit is arranged to parse the second connection request response to acquire the authentication information of the virtual SIM card for accessing the non-local network, which matches the data format information.

In the above solution, the first acquiring module is further arranged to, when it is detected that the network identifier corresponding to the non-local network changes, reacquire the network identifier corresponding to the non-local network.

According to the method for implementing network access, the terminal and the computer storage medium provided by the disclosure, when it is detected that the terminal is located in the non-local network, the network identifier corresponding to the non-local network is acquired, wherein the non-local network is different from the network to which the SIM card of the terminal belongs; the data connection is established according to the network identifier, and the authentication information of the virtual SIM card for accessing the non-local network is acquired; and the terminal accesses the non-local network by using the authentication information of the virtual SIM card. As such, the terminal can access the network of a roaming destination by using the acquired information of the virtual SIM card without changing the SIM card, thereby enjoying a lower price and enjoying the same service as the local card based on the normal session in the roaming area.

DETAILED DESCRIPTION

In embodiments of the disclosure, when it is detected that a terminal is located in a non-local network, a network identifier corresponding to the non-local network is acquired, wherein the non-local network is different from a network to which an SIM card of the terminal belongs; a data connection is established according to the network identifier, and authentication information of a virtual SIM card for accessing the non-local network is acquired; and the terminal accesses the non-local network by using the authentication information of the virtual SIM card.

Here, the terminal is a terminal supporting a virtual SIM card technology.

The disclosure is further elaborated below in combination with the accompanying drawings and specific embodiments.

Figure 1:
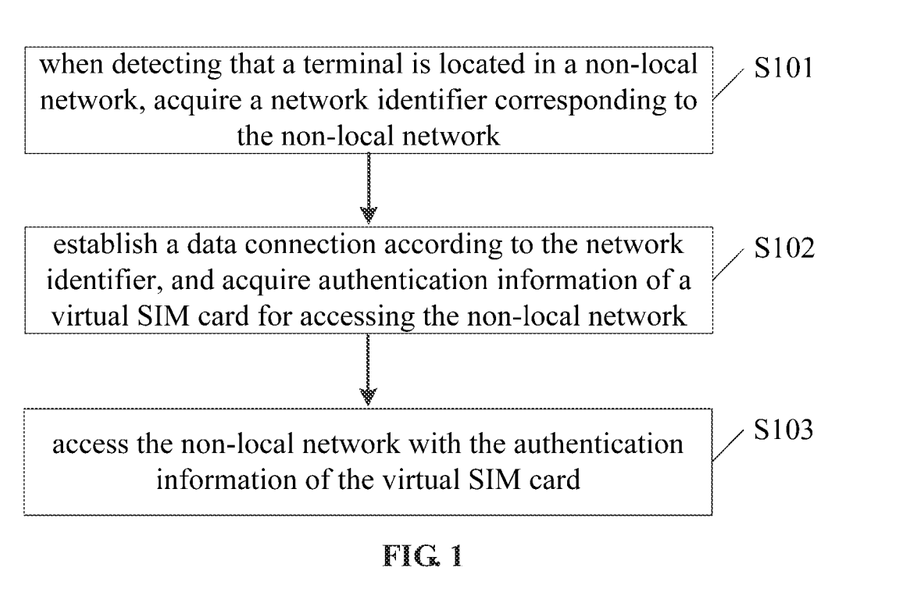
FIG. 1 is a flowchart of a method for implementing network access according to an embodiment of the disclosure.

FIG. 1 is a flowchart of a method for implementing network access according to an embodiment of the disclosure. As shown in FIG. 1, the method for implementing network access according to an embodiment of the disclosure includes the following steps.

In S101, when it is detected that a terminal is located in a non-local network, a network identifier corresponding to the non-local network is acquired.

Herein, the non-local network is different from a network to which an SIM card of the terminal belongs. For example, the terminal is in a roaming state, or the terminal switches from a 2G network to a 3G network.

Specifically, after being powered up, the terminal determines that it is in the non-local network by detecting that it is in the roaming state; and then, the terminal acquires the network identifier corresponding to the non-local network.

In S102, a data connection is established according to the network identifier, and authentication information of a virtual SIM card for accessing the non-local network is acquired.

Here, the terminal establishes, through information interaction with a network server and a database server at a network side, the data connection with the network server according to the network identifier, and acquires the authentication information of the virtual SIM card for accessing the non-local network from the network server.

Figure 2:
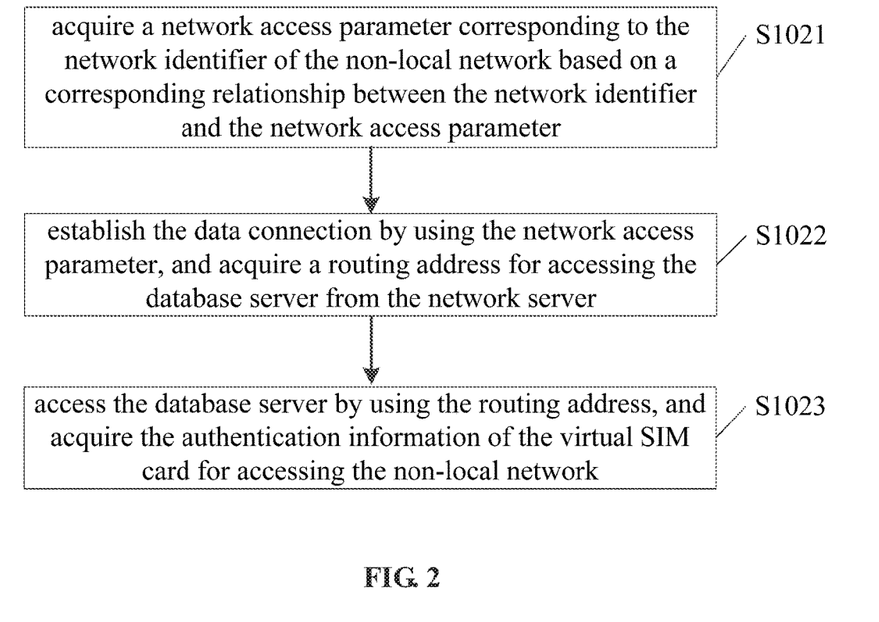
FIG. 2 a flowchart of establishing a data connection, and acquiring authentication information of a virtual SIM card for accessing a non-local network according to an embodiment of the disclosure.

Specifically, as shown in FIG. 2, for the terminal, in order to establish the data connection according to the network identifier, and acquire the authentication information of the virtual SIM card for accessing the non-local network, the following steps are included.

In S1021, a network access parameter corresponding to the network identifier of the non-local network is acquired based on a corresponding relationship between the network identifier and the network access parameter;

Herein, the network identifier can be the Mobile Country Code (MCC)/Mobile Network Code (MNC); the network access parameter can be a preset Access Point Name (APN). Note that, when the terminal supporting the SIM card technology is delivered, a database list, in which automatically matched network identifiers and network access parameters are stored, has been saved in the terminal; the database list includes the corresponding relationship between the network identifiers and the network access parameters, namely a matching relationship between the MCCs/MNCs of the non-local networks and the locally preset APNs.

Specifically, the terminal traverses the database list including the corresponding relationship between the network identifiers and the network access parameters, and acquires the network access parameter corresponding to the network identifier of the non-local network.

In an application example, two network access parameters APNs are automatically matched according to the network identifier MCC/MNC of the non-local network; one of the two network access parameters is APN0 of a regular service of the non-local network, and is visible to a user; the other is proprietary APN1 of the non-local network, and is invisible to the user. Internet data of the user is transmitted by using a PDP0 established by the APN0, and the data connection, namely the PDP1 connection, is established with the network server by using the APN1, for exchanging data with a proprietary database server of a virtual operator.

Figure 3:
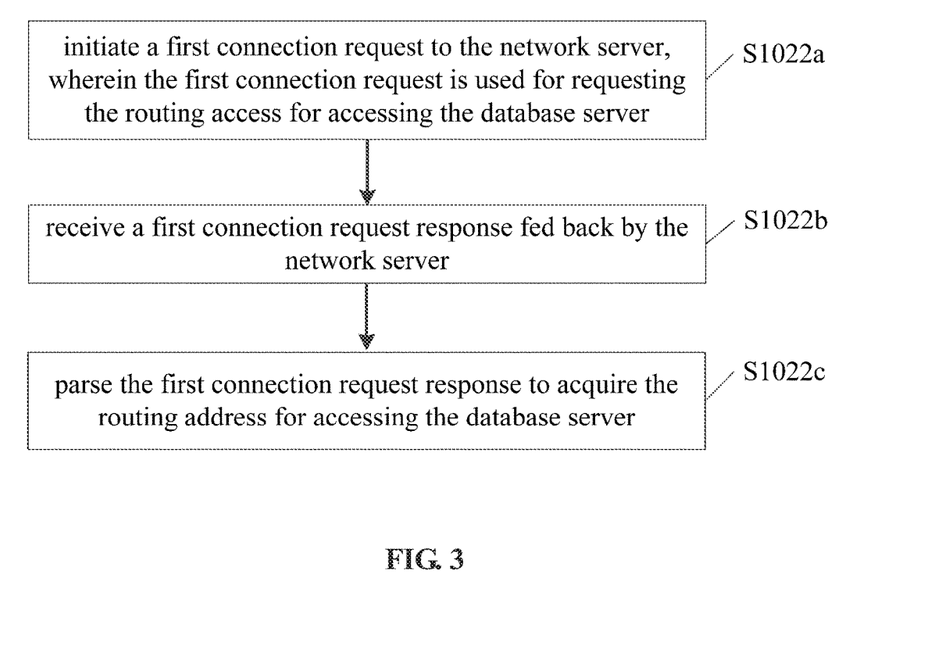
FIG. 3 is a flowchart of establishing a data connection by using a network access parameter, and acquiring a routing address for accessing a database server from a network server according to an embodiment of the disclosure.

In S1022, the data connection is established by using the network access parameter, and a routing address for accessing the database server is acquired from the network server;

Specifically, as shown in FIG. 3, for the terminal, in order to establish the data connection by using the network access parameter, and acquire from the network server the routing address for accessing the database server, the following steps are included:

In S1022a, a first connection request is initiated to the network server, where the first connection request is used for requesting the routing access for accessing the database server.

Herein, the first connection request carries the network access parameter APN1 corresponding to the network identifier of the non-local network.

In S1022b-S1022c, a first connection request response fed back by the network server is received; the first connection request response is parsed to acquire the routing address for accessing the database server.

Here, after receiving the first connection request, the network server establishes a PDP1 connection with the terminal; and then, the network server acquires the network access parameter APN1 corresponding to the network identifier of the non-local network by parsing the first connection request, acquires the routing address, e.g. an IP address, for accessing the database server according to the network access parameter APN1, and transmits the routing address for accessing the database server by feeding back a first connection request response to the terminal. In this way, the terminal receives the first connection request response fed back by the network server, and further parses the first connection request response to acquire the routing address for accessing the database server.

Note that, the virtual operator providing a virtual SIM card service applies to a local operator for the proprietary network access parameter APN1 in advance. As such, after identifying the terminal which uses the APN1 to access by parsing the first connection request, the proprietary database server of the virtual operator can acquire a specific IP address and routing permission from a wireless core network; the IP address can be routed to a proprietary database server address of the virtual operator.

In S1023, the terminal accesses the database server by using the routing address, and acquires the authentication information of the virtual SIM card for accessing the non-local network.

Figure 4:
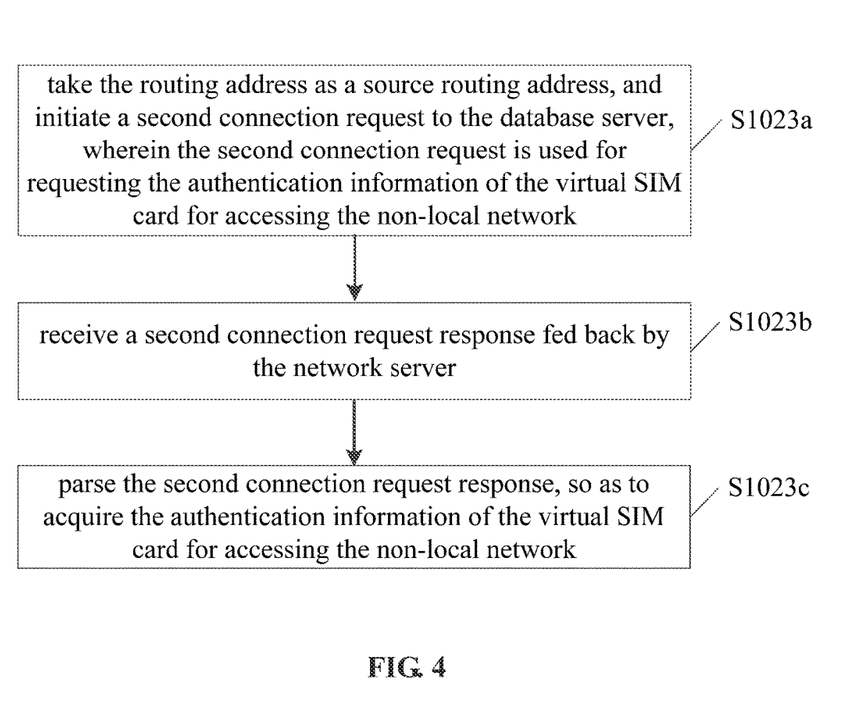
FIG. 4 is a flowchart of accessing the database server by using the routing address, and acquiring the authentication information of the virtual SIM card for accessing the non-local network according to an embodiment of the disclosure.

Specifically, as shown in FIG. 4, for the terminal, in order to access the database server by using the routing address, and acquire the authentication information of the virtual SIM card for accessing the non-local network, the following steps are included.

In S1023a, the routing address is taken as a source routing address, and a second connection request is initiated to the database server, where the second connection request is used for requesting the authentication information of the virtual SIM card for accessing the non-local network.

In S1023b-S1023c, a second connection request response fed back by the network server is received; the second connection request response is parsed to acquire the authentication information of the virtual SIM card for accessing the non-local network.

Herein, the second connection request carries the data format information; correspondingly, for the terminal, in order to parse the second connection request response to acquire the authentication information of the virtual SIM card for accessing the non-local network, the following step is included: the terminal parses the second connection request response to acquire the authentication information of the virtual SIM card for accessing the non-local network, which matches the data format information.

In S103, the terminal accesses the non-local network by using the authentication information of the virtual SIM card.

Specifically, the terminal performs user information registration to the network server corresponding to the non-local network through the authentication information of the virtual SIM card, so as to access the non-local network.

In an application example, the method further includes that: when it is detected that the network identifier corresponding to the non-local network changes, the network identifier corresponding to the non-local network is reacquired.

Specifically, when detecting that the network identifier corresponding to the non-local network changes, the terminal performs S101-S103 again to access the non-local network by reacquiring the network identifier corresponding to the non-local network.

So, through the method for implementing network access of the disclosure, the terminal can access the network at the roaming destination by using acquired information of the virtual SIM card without changing the SIM card, thereby enjoying a lower price and enjoying the same service as the local card based on the normal session in the roaming area.

The disclosure also provides a computer storage medium, in which computer executable instructions are stored; the computer executable instructions are arranged to perform the method for implementing network access of the disclosure.

Figure 5:
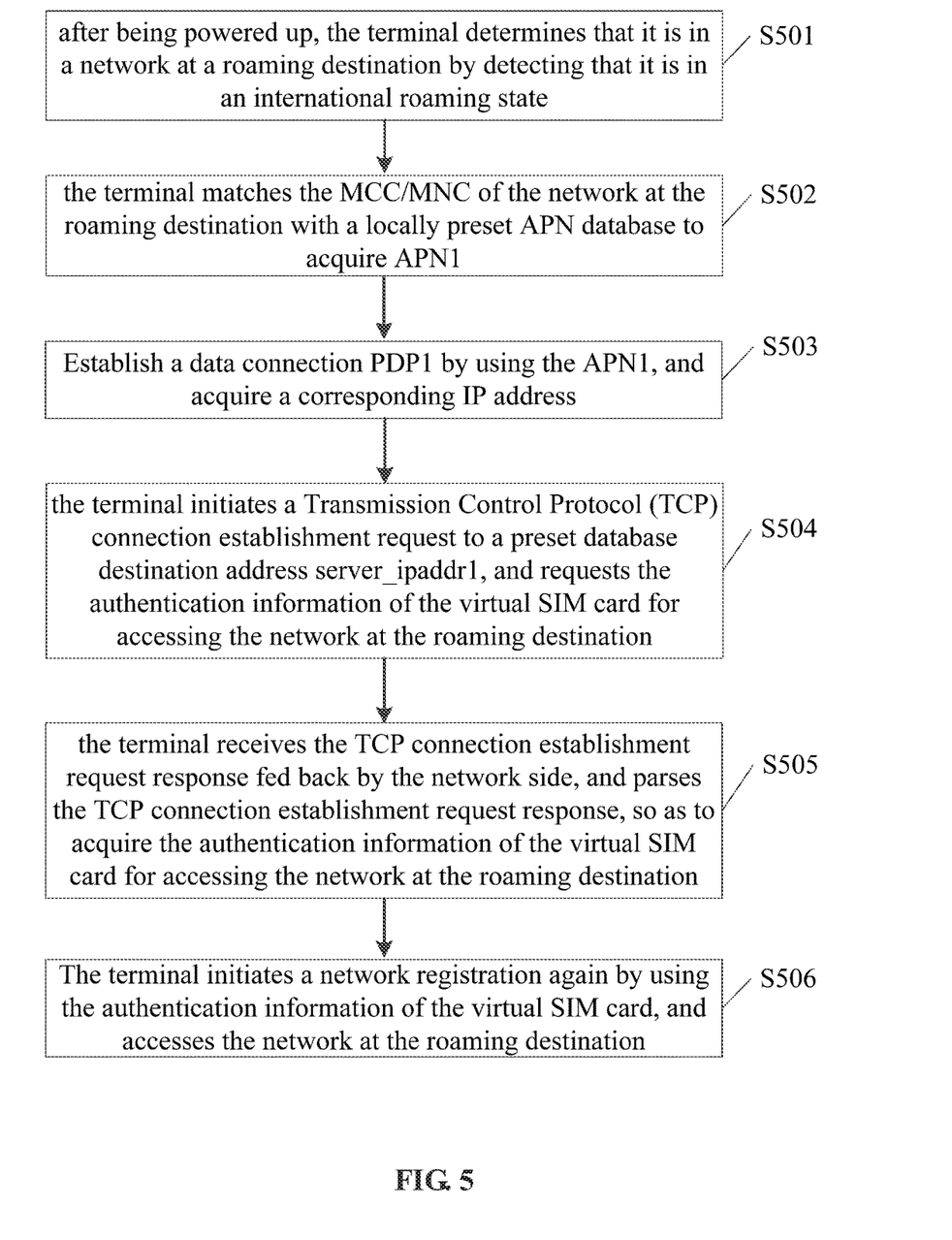
FIG. 5 is a flowchart of a method for implementing network access according to an application example of the disclosure.

FIG. 5 is a flowchart of a method for implementing network access according to an application example of the disclosure. As shown in FIG. 5, the method for implementing network access according to an application example of the disclosure includes the following steps.

In S501, after being powered up, the terminal determines that it is in the network of the roaming destination by detecting that it is in an international roaming state; and then, the terminal acquires the network identifier corresponding to the non-local network.

In S502, the terminal matches the MCC/MNC of the network at the roaming destination with a locally preset APN database, to acquire a matched APN1.

Here, it is to be noted that, the APN0 for establishing the user data connection is acquired while the APN1 is acquired by matching, and the APN0 is used to establish the user data connection PDP0.

In S503, the APN1 is used to establish the data connection PDP1, and the corresponding IP address is acquired;

specifically, when receiving a PDP connection request from the terminal, and determining that it is the APN1, the network side allocates the IP address ip_ipaddr1 for the terminal, and sets the routing permission as being able to be routed to the corresponding database server address server_ipaddr1.

Here, the APN without permission is not allowed to be routed to the server_ipaddr1.

In S504, the terminal initiates a Transmission Control Protocol (TCP) connection establishment request to a preset database destination address server_ipaddr1, and requests the authentication information of the virtual SIM card for accessing the network at the roaming destination.

Here, the core network routes a data packet to the destination address server_ipaddr1 according to the routing permission of a source IP address server_ipaddr1 of the data packet, and a connection is established; after that, the core network returns the authentication information of the corresponding virtual SIM card to the terminal by feeding back a TCP connection establishment request response to the terminal.

In S505, the terminal receives the TCP connection establishment request response fed back by the network side, and parses the TCP connection establishment request response to acquire the authentication information of the virtual SIM card for accessing the network at the roaming destination.

In S506, the terminal initiates a registration again by using the authentication information of the virtual SIM card, and accesses the network at the roaming destination.

Figure 6:
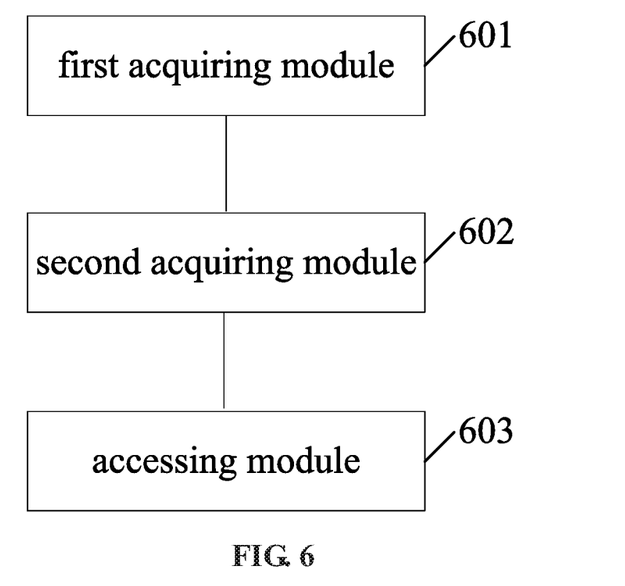
FIG. 6 is a structure diagram of a terminal according to an embodiment of the disclosure.

FIG. 6 is a structure diagram of a terminal according to an embodiment of the disclosure. As shown in FIG. 6, the terminal includes a first acquiring module 601, a second acquiring module 602 and an accessing module 603.

The first acquiring module 601 is arranged to, when it is detected that the terminal is located in the non-local network, acquire the network identifier corresponding to the non-local network, where the non-local network is different from the network to which the SIM card of the terminal belongs.

The second acquiring module 602 is arranged to establish the data connection according to the network identifier, and acquire the authentication information of the virtual SIM card for accessing the non-local network.

The accessing module 603 is arranged to access the non-local network by using the authentication information of the virtual SIM card.

Figure 7:
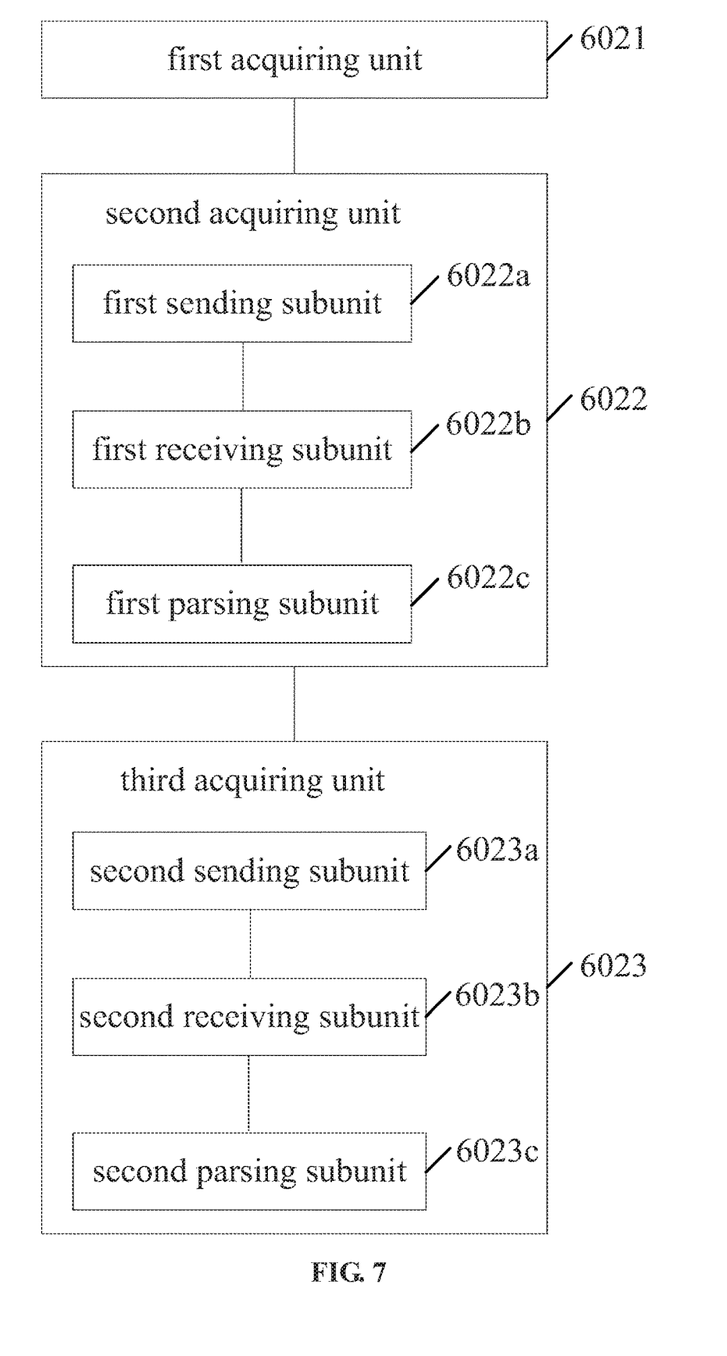
FIG. 7 is a structure diagram of a second acquiring module according to an embodiment of the disclosure.

In an application example, as shown in FIG. 7, the second acquiring module 602 includes a first acquiring unit 6021, a second acquiring unit 6022 and a third acquiring unit 6023.

The first acquiring unit 6021 is arranged to acquire the network access parameter corresponding to the network identifier of the non-local network based on the corresponding relationship between the network identifier and the network access parameter.

The second acquiring unit 6022 is arranged to establish the data connection by using the network access parameter, and acquire the routing address for accessing the database server from the network server.

In an application example, as shown in FIG. 7, the second acquiring unit 6022 includes a first sending subunit 6022a, a first receiving subunit 6022b and a first parsing subunit 6022c.

The first sending subunit 6022a is arranged to initiate the first connection request to the network server, where the first connection request is used for requesting the routing access for accessing the database server, and carries the network access parameter corresponding to the network identifier of the non-local network.

The first receiving subunit 6022b is arranged to receive the first connection request response fed back by the network server.

The first parsing subunit 6022c is arranged to parse the first connection request response to acquire the routing address for accessing the database server.

The third acquiring unit 6023 is arranged to access the database server by using the routing address, and acquire the authentication information of the virtual SIM card for accessing the non-local network.

In an application example, as shown in FIG. 7, the third acquiring unit 6023 includes a second sending subunit 6023a, a second receiving subunit 6023b and a second parsing subunit 6023c.

The second sending subunit 6023a is arranged to take the routing address as the source routing address, and initiate the second connection request to the database server, where the second connection request is used for requesting the authentication information of the virtual SIM card for accessing the non-local network.

The second receiving subunit 6023b is arranged to receive the second connection request response fed back by the network server; and The second parsing subunit 6023c is arranged to parse the second connection request response to acquire the authentication information of the virtual SIM card for accessing the non-local network.

The second connection request carries the data format information; correspondingly, the second parsing subunit 6023c is arranged to parse the second connection request response to acquire the authentication information of the virtual SIM card for accessing the non-local network, which matches the data format information.

In an application example, the first acquiring module 601 is further arranged to, when it is detected that the network identifier corresponding to the non-local network changes, reacquire the network identifier corresponding to the non-local network.

In practical applications, all the modules in the terminal and units and subunits included in the modules can be realized through either a processor in the terminal or a specific logical circuit; for example, in practical applications, they can be realized through a Central Processing Unit (CPU), or a Micro Processing Unit (MPU), or a Digital Signal Processor (DSP), or a Field Programmable Gate Array (FPGA) in the terminal.

The technical solutions in the disclosure can be combined randomly without conflict.

Those skilled in the art should understand that the embodiments of the disclosure can be provided as a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for implementing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of implementing the functions assigned in one or more flows of the flowcharts and/or one or more blocks of the block diagrams.

The above is only the preferred implementations of the disclosure and not intended to limit the scope of protection of the disclosure; any change or replacement that those skilled in the art can think of easily in the scope of technologies disclosed by the disclosure shall fall within the scope of protection of the disclosure.

INDUSTRIAL APPLICABILITY

According to the method for implementing network access provided by the disclosure, when it is detected that the terminal is in the non-local network, the network identifier corresponding to the non-local network is acquired, where the non-local network is different from the network to which the SIM card of the terminal belongs; the data connection is established according to the network identifier, and the authentication information of the virtual SIM card for accessing the non-local network is acquired; and the terminal accesses the non-local network by using the authentication information of the virtual SIM card. As such, the terminal can access the network of the roaming destination by using the acquired information of the virtual SIM card without changing the SIM card, thereby enjoying a lower price and enjoying the same service as the local card based on the normal session in the roaming area.

The invention claimed is:

1. A method for implementing network access, which is applied to a terminal, the method comprising:
    when detecting that the terminal is located in a non-local network, acquiring a network identifier corresponding to the non-local network, wherein the non-local network is different from a network to which a Subscriber Identity Module (SIM) card of the terminal belongs;
    establishing a data connection with a network server according to the network identifier, and acquiring authentication information of a virtual SIM card for accessing the non-local network; and
    accessing the non-local network by using the authentication information of the virtual SIM card;
    wherein the establishing a data connection with a network server according to the network identifier, and acquiring authentication information of a virtual SIM card for accessing the non-local network comprises:
        acquiring a network access parameter corresponding to the network identifier of the non-local network based on a corresponding relationship between the network identifier and the network access parameter;
        establishing the data connection by using the network access parameter, and acquiring, from the network server, a routing address for accessing a database server; and
        accessing the database server by using the routing address, and acquiring the authentication information of the virtual SIM card for accessing the non-local network.

2. The method according to claim 1, wherein the establishing the data connection by using the network access parameter, and acquiring, from the network server, a routing address for accessing a database server comprises:
    initiating a first connection request to the network server, wherein the first connection request is used for requesting the routing address for accessing the database server, and carries the network access parameter corresponding to the network identifier of the non-local network;

receiving a first connection request response fed back by the network server; and parsing the first connection request response to acquire the routing address for accessing the database server.

3. The method according to claim 1, wherein the accessing the database server by using the routing address, and acquiring the authentication information of the virtual SIM card for accessing the non-local network comprises:

taking the routing address as a source routing address, and initiating a second connection request to the database server, wherein the second connection request is used for requesting the authentication information of the virtual SIM card for accessing the non-local network;

receiving a second connection request response fed back by the network server; and parsing the second connection request response to acquire the authentication information of the virtual SIM card for accessing the non-local network.

4. The method according to claim 3, wherein the second connection request carries data format information;

correspondingly, the parsing the second connection request response to acquire the authentication information of the virtual SIM card for accessing the non-local network comprises:

parsing the second connection request response to acquire the authentication information of the virtual SIM card for accessing the non-local network, which matches the data format information.

5. The method according to claim 1, further comprising: when detecting that the network identifier corresponding to the non-local network changes, reacquiring the network identifier corresponding to the non-local network.

6. A terminal, comprising:

a processor; and a memory storing instruction executable by the processor; wherein the processor is arranged to:

when it is detected that the terminal is located in a non-local network, acquire a network identifier corresponding to the non-local network, wherein the non-local network is different from a network to which a Subscriber Identity Module (SIM) card of a terminal belongs;

establish a data connection according to the network identifier with a network server, and acquire authentication information of a virtual SIM card for accessing the non-local network; and access the non-local network by using the authentication information of the virtual SIM card;

wherein the processor is further arranged to:

acquire a network access parameter corresponding to the network identifier of the non-local network based on a corresponding relationship between the network identifier and the network access parameter;

establish the data connection by using the network access parameter, and acquire, from the network server, a routing address for accessing a database server; and access the database server by using the routing address, and acquire the authentication information of the virtual SIM card for accessing the non-local network.

7. The terminal according to claim 6, wherein the processor is further arranged to:

initiate a first connection request to the network server, wherein the first connection request is used for requesting the routing address for accessing the database server, and carries the network access parameter corresponding to the network identifier of the non-local network;

receive a first connection request response fed back by the network server; and parse the first connection request response to acquire the routing address for accessing the database server.

8. The terminal according to claim 6, wherein the processor is further arranged to:

take the routing address as a source routing address, and initiate a second connection request to the database server, wherein the second connection request is used for requesting the authentication information of the virtual SIM card for accessing the non-local network;

receive a second connection request response fed back by the network server; and parse the second connection request response to acquire the authentication information of the virtual SIM card for accessing the non-local network.

9. The terminal according to claim 8, wherein the second connection request carries data format information;

correspondingly, the processor is further arranged to parse the second connection request response to acquire the authentication information of the virtual SIM card for accessing the non-local network, which matches the data format information.

10. The terminal according to claim 6, wherein, the processor is further arranged to, when it is detected that the network identifier corresponding to the non-local network changes, reacquire the network identifier corresponding to the non-local network.

11. A non-transitory computer storage medium, in which computer executable instructions are stored; the computer executable instructions are arranged to perform a method for implementing network access, which is applied to a terminal, the method comprising:

when detecting that the terminal is located in a non-local network, acquiring a network identifier corresponding to the non-local network, wherein the non-local network is different from a network to which a Subscriber Identity Module (SIM) card of the terminal belongs;

establishing a data connection with a network server according to the network identifier, and acquiring authentication information of a virtual SIM card for accessing the non-local network; and accessing the non-local network by using the authentication information of the virtual SIM card;

wherein the establishing a data connection with a network server according to the network identifier, and acquiring authentication information of a virtual SIM card for accessing the non-local network comprises:

acquiring a network access parameter corresponding to the network identifier of the non-local network based on a corresponding relationship between the network identifier and the network access parameter;

establishing the data connection by using the network access parameter, and acquiring, from the network server, a routing address for accessing a database server; and accessing the database server by using the routing address, and acquiring the authentication information of the virtual SIM card for accessing the non-local network.

12. The non-transitory computer storage medium according to claim 11, wherein the establishing the data connection by using the network access parameter, and acquiring, from the network server, a routing address for accessing a database server comprises:
   initiating a first connection request to the network server, wherein the first connection request is used for requesting the routing address for accessing the database server, and carries the network access parameter corresponding to the network identifier of the non-local network;
   receiving a first connection request response fed back by the network server; and
   parsing the first connection request response to acquire the routing address for accessing the database server.

13. The non-transitory computer storage medium according to claim 11, wherein the accessing the database server by using the routing address, and acquiring the authentication information of the virtual SIM card for accessing the non-local network comprises:
   taking the routing address as a source routing address, and initiating a second connection request to the database server, wherein the second connection request is used for requesting the authentication information of the virtual SIM card for accessing the non-local network;
   receiving a second connection request response fed back by the network server; and
   parsing the second connection request response to acquire the authentication information of the virtual SIM card for accessing the non-local network.

14. The non-transitory computer storage medium according to claim 13, wherein the second connection request carries data format information;
   correspondingly, the parsing the second connection request response to acquire the authentication information of the virtual SIM card for accessing the non-local network comprises:
      parsing the second connection request response to acquire the authentication information of the virtual SIM card for accessing the non-local network, which matches the data format information.

15. The non-transitory computer storage medium according to claim 11, wherein the method further comprises:
   when detecting that the network identifier corresponding to the non-local network changes, reacquiring the network identifier corresponding to the non-local network.

* * * * *